Figure 1:
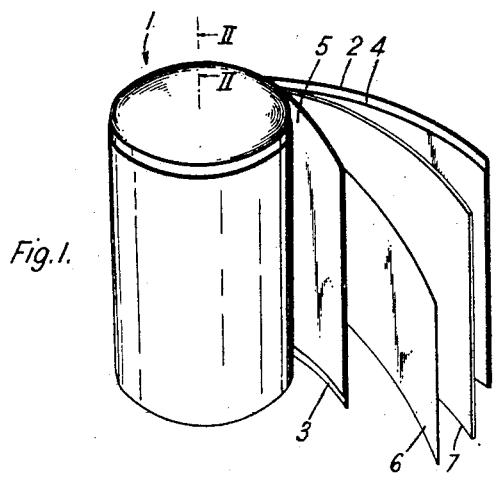

Nov. 26, 1957     TZU EN SHEN ET AL     2,814,091

ELECTRIC CAPACITORS

Filed June 9, 1953

*Inventors*
*Tzu En Shen &*
*John Philip Huggett*

By

*Attorneys*

United States Patent Office 2,814,091
Patented Nov. 26, 1957

2,814,091

ELECTRIC CAPACITORS

Tzu En Shen and John Philip Huggett, London, England, assignors to British Dielectric Research Limited, London, England, a British company Application June 9, 1953, Serial No. 360,583

Claims priority, application Great Britain July 2, 1952

6 Claims. (Cl. 29—25.42)

This invention relates to electrostatic capacitors of the kind having at least a part of one of its electrodes formed by a thin deposit of metal in a finely divided form upon dielectric material, for example upon a strip of paper or polystyrene or upon a sheet of mica.

The invention provides a method of manufacturing an electrostatic capacitor having a capacitance of a required value between a first electrode of which at least a part is formed by a thin deposit of metal on a dielectric layer and a second electrode. The method in accordance with the invention comprises forming the capacitor having a capacitance between the first and second electrodes in excess of the required value and incorporating in it a third electrode and a layer of dielectric which lies between and in contact with the first and third electrode and separates them, applying a voltage between the first and third electrodes and increasing the applied voltage either gradually or in steps to breakdown the separating layer at an increasing number of places and burn off the thin deposit of metal on the adjoining dielectric layer in the immediate vicinity of the breakdown until the capacitance between the first and second electrodes is reduced to the required value.

The provision of the third electrode and the separating layer enables the capacitance of the capacitor to be reduced to a required value by a burning-off operation without damage to the capacitor dielectric carrying the metallic deposit.

In applying the invention to wound capacitors of the type described we may insert the third electrode and the separating dielectric layer towards the end of the operation of winding the capacitor, the third electrode being of such length that on completion of the winding operation it projects beyond the outer ends of the strips of capacitor dielectric to form an exposed terminal. In applying the invention to stack type capacitors such as those built up by stacking sheets of mica each carrying on one surface a thin deposit of metal in finely divided form, the third electrode and its separating layer may be inserted at any convenient point in the stack with the separating layer between the third electrode and the neighbouring metallised surface. Alternatively they may be placed at one end of the stack, namely on the mica sheet having its metallised surface exposed. Where a greater degree of adjusting is required than can be obtained by the use of a single electrode several additional electrodes and a corresponding number of separating layers may be used and inserted at different places in the stack.

Figure 2:
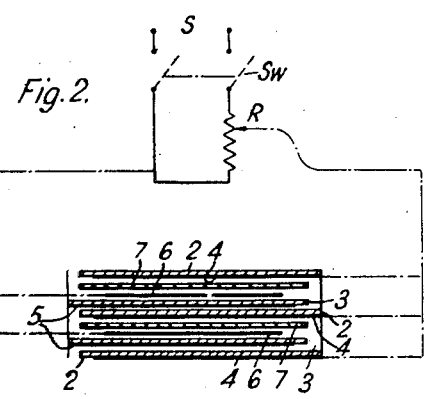
Figure 3:
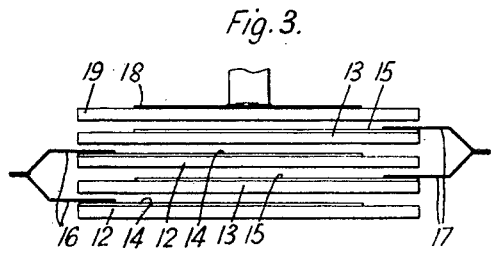

In order that the invention may be more fully understood and readily be put into practice, its application to the manufacture of capacitors of the wound type and capacitors of the stack type will now be described with the aid of the accompanying drawings wherein:

Figure 1 shows a perspective view of an example of an incompletely wound wound type of capacitor made in accordance with the invention, Figure 2 is a diagrammatic section taken on the line II—II of Figure 1, and Figure 3 is a diagrammatic cross-section of an example of a stack-type capacitor made in accordance with the invention.

The capacitor 1 shown in Figure 1 of the drawings is formed by winding into a roll two strips 2 and 3 of polystyrene film each carrying on the inner of its two surfaces a deposit of metal, e. g. cadmium, of the order of one-tenth of one micron thick, applied by evaporation in vacuum. The deposit on the strip 2 extends over the whole inner surface except for a margin at the upper edge of the strip and the deposit on the strip 3 extends over the whole inner surface except for a margin at the lower edge of the strip. The deposits thus form two relatively laterally staggered capacitor electrodes 4 and 5. We prefer to use as the third electrode 6 a relatively short length of tin foil of a thickness of about six microns and to use as the separator dielectric separating the third electrode 6 from the electrode 4 that would otherwise be in contact with it a strip 7 of paper having a thickness approximating to that of the normal dielectric 2 and 3. The capacitance of the capacitor 1 can be reduced to bring it to the required value by applying a voltage between the third electrode 6 and the capacitor electrode 4 separated from it by the separating strip 7. The arrangement is shown diagrammatically in Figure 2 where S is a source of electric supply of appropriate voltage and R is a voltage regulating device. It will be clear from Figure 2 that if electrical breakdown arising from this application of voltage is to be confined to the separating strip 7, the dielectric strength of this strip must be lower than the aggregate dielectric strength of the two strips 2 and 3 unless the two capacitor electrodes 4 and 5 are held at the same potential in which case the dielectric strength of the strip 7 must be lower than that of the strip 3 next to the third electrode 6. By confining breakdown to the separating strip 7, the adjustment in capacitance, brought about by electrically burning away the deposit 4 on the adjoining capacitor dielectric layer 2 at an increasing number of places as the voltage is increased, will be made without the breakdown of normal dielectric layers 2 and 3 would occur if the adjustment of capacitance were to be effected by the application of voltage of the two normal electrodes 4 and 5 of the capacitor. The voltage necessary to effect the required reduction in the capacitance between the two metallised surfaces constituting the capacitor electrodes will naturally depend upon the thickness and quality of the separating layer. Where this is of paper either a direct or alternating current voltage may be used for the burning off operation.

The area of the third electrode will depend upon the maximum degree of adjustment of capacitance to be provided for. For example where a possible reduction of 5% in capacitance has to be provided for, the minimum area of third electrode over-lapping the capacitor electrode from which it is separated by the separating layer will be greater than 5%, and will preferably be about 10%, of the area of such capacitor electrode.

An example of a stack-type capacitor is shown in Figure 3. It is formed by stacking sheets of mica each having on its upper surface a thin deposit of metal in finely divided form, preferably a deposit applied by a vacuum deposition process. Sheets 12 each having a deposit 14 extending from the left hand end to within a short distance of the opposite end so as to leave an unmetallised margin at that end alternate with sheets 13 each having a deposit 15 extending from the right hand end to within a short distance of the opposite end so as to leave an unmetallised margin at that end, as shown. Unmetallised margins are left along both sides of each sheet. Metal foil tabs 16 and 17 are inserted to connect alternate metallised layers in parallel. The third electrode 18 is of metal foil and is shown placed on top of the stack, its separating layer 19 being interposed between it and the metallised upper surface 15 of the top sheet of mica dielectric. With this arrangement, voltage is applied between the third electrode 18 and the neighbouring electrode 15. Breakdown of the capacitor dielectric cannot take place during the capacitance adjusting process even if the breakdown strength of the separating layer 19 is greater than that of one or more capacitor dielectric layers. Alternatively, the third electrode 18 and its separator 19 may be inserted in the middle of the stack but in this case, if breakdown is to be confined to the separating layer and adjustment in capacitance made without breakdown of normal dielectric, the dielectric strength of the separating layer 19 must be lower than the aggregate dielectric strength of two normal dielectric layers of the capacitor unless the two capacitor electrodes are held at the same potential in which event the strength of the layer 19 must be lower than the strength of a single normal dielectric layer. This will be clear from a comparison between Figures 2 and 3.

What we claim as our invention is:

1. A method of manufacturing an electrostatic capacitor having a capacitance of a required value between a first electrode at least a part of which is formed by a thin deposit of metal on a dielectric layer and a second electrode, which comprises forming a capacitor having a capacitance between the first and second electrodes in excess of the required value and incorporating therein a third electrode and a separating layer of dielectric which lies between and in contact with the first and third electrodes, applying a voltage between the first and third electrodes and increasing the applied voltage to break down the separating layer at an increasing number of places and burn off the thin deposit of metal on the adjoining dielectric layer in the immediate vicinity of the breakdown, until the capacitance between the first and second electrodes is reduced to the required value.

2. A method of manufacturing an electrostatic capacitor having a capacitance of a required value between a first electrode at least a part of which is formed by a thin deposit of metal on a dielectric layer and a second electrode, which comprises forming a capacitor having a capacitance between the first and second electrodes in excess of the required value and incorporating therein a third electrode and a separating layer of paper which lies between and in contact with the first and third electrodes, applying a voltage between the first and third electrodes and increasing the applied voltage to break down the separating layer at an increasing number of places and burn off the thin deposit of metal on the adjoining dielectric layer in the immediate vicinity of the breakdown, until the capacitance between the first and second electrodes is reduced to the required value.

3. A method of manufacturing an electrostatic capacitor having a capacitance of a required value between a first electrode at least a part of which is formed by a thin deposit of metal on a dielectric layer and a second electrode, which comprises forming a capacitor having a capacitance between the first and second electrodes in excess of the required value and incorporating therein a third electrode and a separating layer of dielectric which lies between and in contact with the first and third electrodes, applying a voltage between the first and third electrodes and increasing the applied voltage gradually to break down the separating layer at an increasing number of places and burn off the thin deposit of metal on the adjoining dielectric layer in the immediate vicinity of the breakdown, until the capacitance between the first and second electrodes is reduced to the required value.

4. A method of manufacturing an electrostatic capacitor having a capacitance of a required value between a first electrode at least a part of which is formed by a thin deposit of metal on a dielectric layer and a second electrode, which comprises forming a capacitor having a capacitance between the first and second electrodes in excess of the required value and incorporating therein a third electrode and a separating layer of dielectric which lies between and in contact with the first and third electrodes, applying a voltage between the first and third electrodes and increasing the applied voltage step by step to break down the separating layer at an increasing number of places and burn off the thin deposit of metal on the adjoining dielectric layer in the immediate vicinity of the breakdown, until the capacitance between the first and second electrodes is reduced to the required value.

5. A method of manufacturing a wound type of electrostatic capacitor having a capacitance of required value between a first electrode formed at least in part by a thin deposit of metal on a dielectric layer and a second electrode, which comprises forming a wound capacitor having a capacitance between the first and second electrodes in excess of the required value and towards the end of the operation of winding the capacitor inserting a third electrode and a separating layer of dielectric which lies between and in contact with the first and third electrodes, the third electrode being of such a length that on completion of the winding operation it projects beyond the outer end of the strips of capacitor dielectric to form a terminal, applying a voltage between the first and third electrodes and increasing the applied voltage to break down the separating layer at an increasing number of places and burn off the thin deposit of metal on the adjoining dielectric layer in the immediate vicinity of the breakdown, until the capacitance between the first and second electrodes is reduced to the required value.

6. A method of manufacturing a stack type of electrostatic capacitor having a capacitance of required value, which comprises making a stack type capacitor having a capacitance in excess of the required value by stacking sheets of dielectric each carrying on one surface a thin deposit of metal in finely divided form and placing a separating layer and a third electrode on one of the stacked sheets with the separating layer in contact with the deposit of metal on the sheet and between the deposit and the third electrode, applying a voltage between the third electrode and the thin deposit of metal with which the separating layer is in contact and increasing the applied voltage to break down the separating layer at an increasing number of places and burn off the thin deposit of metal on the adjoining sheet of dielectric in the immediate vicinity of the breakdown, until the capacitance of the capacitor is reduced to the required value.

References Cited in the file of this patent

UNITED STATES PATENTS

| 1,774,875 | Evans | Sept. 2, 1930 |
| 2,053,334 | Hetenyi | Sept. 8, 1936 |
| 2,597,511 | Mellen | May 20, 1952 |
| 2,603,737 | Erdman | July 15, 1952 |